ced Dec. 18, 1956

2,774,791

WATER SOLUBLE SUBSTITUTED p-HYDROXY-BENZALDEHYDE-ALKALI METAL AND ALKALINE EARTH METAL CARBONATE AND BICARBONATE SOLID COMPLEXES

Arthur Alt, Kirkwood, Mo., assignor to Monsanto Chemical Company, St. Louis, Mo., a corporation of Delaware No Drawing. Application October 19, 1953,
Serial No. 387,034

15 Claims. (Cl. 260—600)

This invention relates to the water-soluble solid complexes of certain substituted para-hydroxybenzaldehydes; more specifically, this invention relates to novel water-soluble solid complexes whose structure is uncertain but are believed to be addition products of the formula

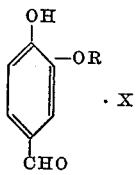

wherein R represents an organic radical and X represents an alkali metal carbonate or bicarbonate or an alkaline earth metal carbonate. Illustrative, but not limitative, of the organic radicals, represented by R in the above formula, which may be present in the solid complexes of this invention are the saturated alkyl radicals, such as methyl, ethyl, propyl, isopropyl, butyl, sec. butyl, isobutyl, tert. butyl, amyl, hexyl, 2-methylpentyl, 2-ethylhexyl, decyl, tetradecyl, octadecyl, etc.; unsaturated aliphatic radicals, such as allyl, methallyl, crotyl, etc.; substituted aliphatic radicals, such as methoxyethyl, propoxyethyl, ethoxyethyl, 2-bromoethyl, benzyl, phenylethyl, etc.; aryl radicals, such as phenyl, naphthyl, biphenyl, etc.; substituted aryl radicals, such as cresyl, chlorophenyl, 2,4-dichlorophenyl, pentachlorophenyl, xylyl, mesityl, p-tert. amylphenyl, o-methoxyphenyl, p-nitrophenyl, o-iodophenyl, m-aminophenyl, etc.; alicyclic radicals, such as cyclohexyl, cyclopentyl, etc.; and heterocyclic radicals, such as furfuryl, tetrahydrofurfuryl, etc. A preferred embodiment of this invention consists of those water-soluble solid complexes wherein R represents a radical selected from the group consisting of aralkyl and alkyl radicals in which radicals the alkyl substituent has from 1 to 8 carbon atoms.

The novel water-soluble solid complexes of this invention have been found to have a variety of utilities. Several of these complexes have exceptional utility as flavoring agents for beverages and foodstuffs. In such applications they may be used per se or in combination with other flavoring agents. Some of these solid complexes because of their exceptionally pleasing odors, have utility as odor masking agents in rubber and synthetic resinous compositions. Some of these new materials may also be used in combination with coumarin as effective fixatives for perfumes and oils, improving the lasting qualities of the most delicate bouquets.

While the molar ratio of the alkali metal or alkaline earth metal carbonate or bicarbonate combined with the previously described substituted p-hydroxybenzaldehydes in the novel water-soluble solid complexes of this invention may be varied over a wide range, the ratio of one to the other will be that of small whole numbers. Generally the new complexes will contain at least about a 0.5 molecular proportion of the alkali metal or alkaline earth metal carbonate or bicarbonate for each molecular proportion of the substituted p-hydroxybenzaldehyde. The new solid complexes may also contain as high as about three molecular proportions of the alkali metal or alkaline earth metal carbonates or bicarbonates for each one molecular proportion of the substituted p-hydroxybenzaldehyde.

The novel water-soluble solid complexes of this invention may be conveniently prepared by admixing a solid alkali metal carbonate or bicarbonate or solid alkaline earth metal carbonate with a substituted p-hydroxybenzaldehyde in an inert organic solvent. Typical of the inert organic solvents which may be utilized are benzene, toluene, xylene, butanol, chlorobenzene, chlorotoluene, chloroform, ethylene dichloride, perchloroethylene, naphtha, etc. Any of the alkali metal or alkaline earth metal carbonates or bicarbonates may be utilized such as the sodium, potassium, lithium, calcium and magnesium carbonates and bicarbonates provided they are employed in solid form. Preferably at least a 0.5 molecular proportion of the solid alkali metal or alkaline earth metal carbonate or bicarbonate is utilized for each one molecular proportion of the substituted p-hydroxybenzaldehyde. While it is preferred that the system be anhydrous, substantially anhydrous systems, i. e. a system containing not more than about 1% by weight of water, are operable. The temperature of the addition reaction may be varied over a wide range, being governed principally by the freezing point and boiling point of the reaction mixture. Temperatures in the range of from about —10° C. to about 350° C. have been found applicable. Preferably the temperature is maintained in the range of from about —10 C. to about 150° C.

The following examples are illustrative of the novel solid complexes of this invention:

EXAMPLE I 100 parts by weight of 3-methoxy-4-hydroxybenzaldehyde were dissolved in 300 parts by weight of benzene and the solution heated to a temperature of about 70° C. 70 parts by weight of anhydrous sodium carbonate were added to the solution and the mixture stirred for two hours while maintaining a temperature of approximately 70° C. The mixture was then cooled, precipitating an equimolecular solid complex of 3-methoxy-4-hydroxybenzaldehyde and sodium carbonate which was removed from the reaction mixture by filtration, washed with benzene and the benzene then removed by heating the salt at a temperature of 50° C. under a reduced pressure of 25 mm. Hg absolute.

The solid complex thus obtained was a white crystalline solid which was soluble in water, a 10–15% solution having a pH of 8 to 10. The water solution on acidification with a strong mineral acid liberated carbon dioxide as well as precipitated vanillin. The solid complex when heated in a flame burned slowly to leave an alkaline ash.

EXAMPLE II 100 parts by weight of 3-ethoxy-4-hydroxybenzaldehyde were dissolved in 300 parts by weight of chlorobenzene at a temperature of 100° C. With constant agitation and while maintaining a temperature of 100° C., 100 parts by weight of anhydrous sodium carbonate were added to the solution and the solution stirred for an additional two hours. The solution was then cooled to 5° C., precipitating a solid complex of 3-ethoxy-4-hydroxybenzaldehyde and sodium carbonate in a molar ratio of 2:3 which was removed therefrom by filtration, washed with chlorobenzene, and residual chlorobenzene removed by heating at a temperature of 75° C. under a reduced pressure of 20 mm. Hg absolute.

The solid complex thus obtained was a while crystalline solid which was soluble in water, a 10–15% solution having a pH of 8 to 10. The water solution on acidification with a strong mineral acid liberated carbon dioxide as well as precipitated 3-ethoxy-4-hydroxybenzaldehyde. The solid complex when heated in a flame, burned slowly leaving an alkaline ash.

EXAMPLE III

The procedure as described in Example I was repeated utilizing in place of the 70 parts by weight of the anhydrous sodium carbonate, 166 parts by weight of anhydrous solid sodium bicarbonate. The water-soluble solid complex thus obtained was found to contain three molecular proportions of sodium bicarbonate for each one molecular proportion of 3-methoxy-4-hydroxybenzaldehyde.

EXAMPLE IV 39 parts by weight of 3-butoxy-4-hydroxybenzaldehyde were dissolved in 200 parts by weight of chlorobenzene at a temperature of 100° C. With continuous stirring, 28 parts by weight of anhydrous potassium carbonate were added and the mixture stirred for an additional two hours. The mixture was then cooled to a temperature of about 10° C., precipitating a solid complex of 3-butoxy-4-hydroxybenzaldehyde and potassium carbonate containing approximately one molecular proportion of potassium carbonate for each one molecular proportion of the substituted benzaldehyde.

EXAMPLE V

A solid complex containing one molecular proportion of sodium carbonate for each one molecular proportion of the substituted benzaldehyde was prepared in accordance with the procedure set forth in Example I, utilizing 25 parts by weight of 3-(2-ethylhexoxy)-4-hydroxybenzaldehyde, 10 parts by weight of anhydrous sodium carbonate and 100 parts by weight of benzene.

EXAMPLE VI

A solid complex containing two molecular proportions of sodium carbonate for each one molecular proportion of 3-benzoxy-4-hydroxybenzaldehyde was prepared in accordance with the procedure described in Example I, utilizing 228 parts by weight of 3-benzoxy-4-hydroxybenzaldehyde, 212 parts by weight of anhydrous sodium carbonate and 500 parts by weight of benzene.

EXAMPLE VII

The procedure described in Example I was repeated, utilizing in place of the 70 parts by weight of sodium carbonate, 92 parts by weight of anhydrous potassium bicarbonate. An excellent yield of a substantially pure solid complex of 3-methoxy-4-hydroxy-benzaldehyde and potassium bicarbonate having a molar ratio of 2:3 was obtained.

EXAMPLE VIII

The procedure as described in Example II was repeated, utilizing in place of the 100 parts by weight of sodium carbonate, 100 parts by weight of anhydrous calcium carbonate. An excellent yield of the solid complex of 3-ethoxy-4-hydroxybenzaldehyde and calcium carbonate having a molar ratio of 2:1 was obtained.

EXAMPLE IX

A solid complex was prepared in accordance with the procedure described in Example IV, utilizing in place of the 28 parts by weight of potassium carbonate, 34 parts by weight of anhydrous magnesium carbonate. An excellent yield of the solid complex of 3-butoxy-4-hydroxybenzaldehyde and magnesium carbonate having a molar ratio of 1:2 was obtained.

EXAMPLE X

The procedure set forth in Example I was repeated, utilizing in place of the 70 parts by weight of sodium carbonate, 110 parts by weight of anhydrous sodium bicarbonate. An excellent yield of a solid complex of 3-methoxy-4-hydroxybenzaldehyde and sodium bicarbonate was obtained which contained two molecular proportions of sodium bicarbonate for each one molecular proportion of the substituted benzaldehyde.

As afore illustrated vanillin (3-methoxy-4-hydroxybenzaldehyde) forms a complex salt with the alkali metal and the alkaline earth metal carbonates and bicarbonates, which solid complex is insoluble in anhydrous inert organic solvents. It is, therefore, possible to separate vanillin from a crude vanillin by dissolving the crude vanillin in an inert organic solvent, treating such mixture with an anhydrous alkali metal or an alkaline earth metal carbonate and bicarbonate, and precipitating therefrom a vanillin solid complex. The vanillin solid complex may then be separated from the reaction mixture by filtration or centrifugation and subsequently acidified to liberate vanillin. The following examples are illustrative of this aspect of the present invention:

EXAMPLE XI

Approximately 136 parts by weight of a crude vanillin obtained from guaiacol and containing approximately 75% of vanillin were dissolved in approximately 272 parts by weight of monochlorobenzene. The solution was heated to approximately 75° C. and 71.2 parts by weight of anhydrous sodium carbonate were added. The mixture was then heated to about 100° C. with continuous stirring and held at that temperature for approximately one hour. The mixture was then cooled to approximately 10° C. and the vanillin solid complex filtered and washed with chlorobenzene. The washed substantially equimolar vanillin-sodium carbonate solid complex was then dissolved in approximately 214 parts by weight of water and acidified with 60° Bé. sulfuric acid to a pH of approximately 6. The vanillin was then removed, dehydrated, stripped of residual chlorobenzene, and given a straight take-over distillation to yield approximately 102 parts by weight of vanillin having a crystallizing point of 80.3° C. The quantity of recovered vanillin represented approximately a quantitive recovery of the vanillin contained in the crude vanillin.

EXAMPLE XII

The procedure described in Example XI was repeated utilizing potassium carbonate. An excellent yield of substantially pure vanillin was separated.

EXAMPLE XIII

The procedure described in Example XI was repeated utilizing sodium bicarbonate. An excellent yield of substantially pure vanillin was separated.

EXAMPLE XIV

The procedure described in Example XI was repeated utilizing calcium carbonate. An excellent yield of substantially pure vanillin was separated.

EXAMPLE XV 100 parts by weight of crude vanillin obtained by the degradation of lignin were dissolved in approximately 200 parts by weight of butanol. To this mixture was then added 70 parts by weight of sodium carbonate and the reaction mixture stirred for approximately two hours at a temperature of about 50° C. The substantially equimolar sodium carbonate-vanillin solid complex that precipitated was removed by filtration, washed with butanol and the vanillin separated therefrom in accordance with the procedure described in Example I. An excellent yield of the vanillin contained in the crude was thus separated.

The foregoing vanillin recovery process of this invention is applicable to the separation of vanillin from crude vanillin obtained by the extraction of vanillin from vanilla bean, the degradation of lignin and various crudes synthetically obtained from guaiacol and/or eugenol.

This application is a continuation-in-part of co-pending application Serial No. 160,589, filed May 6, 1950, now abandoned and co-pending application Serial No. 160,593, filed May 6, 1950, now abandoned.

What is claimed is:

1. As compositions of matter, water-soluble solid complexes having the following formula

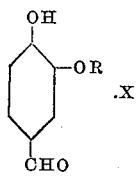

wherein R represents an organic radical and X represents a compound selected from the group consisting of the alkali metal and alkaline earth metal carbonates and bicarbonates.

2. As compositions of matter, water-soluble solid complexes having the formula

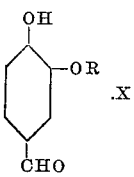

wherein R represents a radical selected from the group consisting of aralkyl and alkyl radicals in which radicals the alkyl substituent contains from 1 to 8 carbon atoms, and X is selected from the group consisting of the alkali metal and alkaline earth metal carbonates and bicarbonates, the molar ratio of substituted p-hydroxy benzaldehyde to X being 1:0.5 to 3.

3. The water-soluble solid complex as described in claim 2 wherein R is a methyl radical.

4. The water-soluble solid complex as described in claim 3 wherein the compound selected from the group consisting of the alkali metal and alkaline earth metal carbonates and bicarbonates is sodium carbonate.

5. The water-soluble solid complexes as described in claim 2 wherein R is an ethyl radical.

6. The water-soluble solid complexes as described in claim 5 wherein the compound selected from the group consisting of the alkali metal and alkaline earth metal carbonates and bicarbonates is sodium carbonate.

7. A process for the preparation of water-soluble solid complexes having the formula

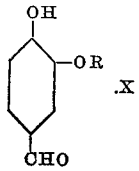

wherein R represents an organic radical and X represents a compound selected from the group consisting of the alkali metal and alkaline earth metal carbonates and bicarbonates, which comprises admixing in an inert organic solvent under substantially anhydrous conditions a substituted para-hydroxybenzaldehyde having the formula

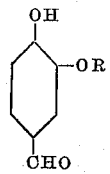

wherein R represents an organic radical with an anhydrous compound selected from the group consisting of the alkali metal and alkaline earth metal carbonates and bicarbonates.

8. The process as described in claim 7 wherein R represents a radical selected from the group consisting of aralkyl and alkyl radicals in which radicals the alkyl substituent contains from 1 to 8 carbon atoms.

9. The process as described in claim 8 wherein R represents a methyl radical.

10. The process as described in claim 9 wherein the compound selected from the group consisting of the alkali metal and alkaline earth metal carbonates and bicarbonates is anhydrous sodium carbonate.

11. In a process for the separation of vanillin from crude vanillin, the step comprising mixing under substantially anhydrous conditions at least 0.5 molecular proportion of an anhydrous compound selected from the group consisting of the alkali metal and alkaline earth metal carbonates and bicarbonates with a crude vanillin containing approximately a one molecular proportion of vanillin dissolved in a substantially anhydrous inert organic solvent and recovering therefrom the precipitated vanillin solid complex.

12. The process as described in claim 11 wherein the organic solvent is chlorobenzene.

13. The process as described in claim 11 wherein the organic solvent is butanol.

14. The process as described in claim 11 wherein the compound selected from the group consisting of the alkali metal and alkaline earth metal carbonates and bicarbonates is sodium carbonate.

15. In a process for the separation of vanillin from crude vanillin, the steps comprising mixing under substantially anhydrous conditions at least a 0.5 molecular proportion of an anhydrous compound selected from the group consisting of the alkali metal and alkaline earth metal carbonates and bicarbonates with a crude vanillin containing approximately a one molecular proportion of vanillin dissolved in a substantially anhydrous inert organic solvent, recovering therefrom the precipitated vanillin solid complex, and acidifying the recovered vanillin solid complex.

References Cited in the file of this patent
FOREIGN PATENTS
316,444  Great Britain _____ Aug. 1, 1929